United States Patent [19]

Contri et al.

[11] Patent Number: 4,568,193
[45] Date of Patent: Feb. 4, 1986

[54] INTERMITTENT LOW SPEED CONTROL FOR MOTOR OPERATED APPLIANCE

[75] Inventors: Robert F. Contri, Westmont; Donald A. Sadecki, Westchester, both of Ill.

[73] Assignee: John Zink Company, Tulsa, Okla.

[21] Appl. No.: 629,033

[22] Filed: Jul. 9, 1984

[51] Int. Cl.⁴ .............................................. B01F 13/00
[52] U.S. Cl. .................................... 366/206; 318/325; 318/327; 366/197; 366/601
[58] Field of Search ............... 366/197, 129, 199, 200, 366/201, 206, 207, 343, 344, 601; 318/325, 327, 345 D, 462

[56] References Cited

U.S. PATENT DOCUMENTS

| | | | |
|---|---|---|---|
| 4,227,128 | 10/1980 | Cockroft et al. | 318/325 |
| 4,227,181 | 10/1980 | Stahly et al. | 340/825.63 |
| 4,326,153 | 6/1982 | Contri | 318/327 |

Primary Examiner—Timothy F. Simone
Attorney, Agent, or Firm—Neil M. Rose; Clifford A. Dean

[57] ABSTRACT

A food preparation appliance including a housing, an electric motor supported in said housing and adapted to receive alternating current. A tachometer senses rotation of said electric motor and feeds a tachometer signal to a frequency to voltage converter. A conversion ratio between said tachometer input signal and an output signal of said frequency to voltage converter is alterable by actuating a timer which causes a speed of the electric motor to decrease. The output signal of the frequency to voltage converter is supplied to an error amplifier where it is compared with a setpoint signal to generate an error signal supplied to a triac which controls a flow of electric power through the electric motor.

6 Claims, 5 Drawing Figures

INTERMITTENT LOW SPEED CONTROL FOR MOTOR OPERATED APPLIANCE

BACKGROUND OF THE INVENTION

It is well known in the art to employ motor operated appliances for various tasks involved in preparing food, including slicing, shredding, mixing, kneading, chopping and the like. One of the problems involved in using such appliances was the difficulty, particularly with appliances adapted to mix and knead, in maintaining a constant mixing or kneading velocity of the mixing or kneading elements as the load on the appliance changed.

A number of solutions were found to the problem. One of them involved the use of various closed loop speed control systems, some of which employed a mechanical governor as a speed sensor which controlled a firing angle of a triac, such as disclosed in U.S. Pat. No. 4,227,128 to Cockroft et al. Another approach involved the use of an all electronic speed control which employed a magnetic tachometer to sense a rotational speed of an interrupter wheel mechanically connected to a motor and which controlled the firing angle of a triac connected to the motor, as is disclosed in U.S. Pat. No. 4,326,153 to Contri.

Despite the advantages which clearly accrued from these prior art speed control systems, there were still problems in the use of such systems. The primary problem involved the difficulty when such a system was used with a mixing appliance, such as an electric food mixer of the type disclosed in U.S. Pat. No. 4,277,181 to Stahly et al. of introducing powders or liquid ingredients into a mixing bowl while the mixing appliance was running in accordance with the dictates of a recipe. Users often found that when powders, in particular, were introduced into the mixing bowl they had a tendency to puff out or be thrown out of the bowl by the whippers, causing a loss of the premeasured ingredients which might alter the characteristics of the food being mixed and also lead to the possibility that some of the ejected powder, in airborne form, could be drawn in through cooling vents in the mixer, ultimately collecting therein and damaging the mixer. Similar problems were encountered with the addition of various liquids which could be splashed out of the mixing bowl due to the rapid rotation of the whippers in accordance with recipe instructions.

One possible solution for this problem would be the manual adjustment of the mixer to a lower speed while the powders and liquid are being introduced into the bowl. A problem arises, however, in that users often forget to return the mixer to the desired mixing speed once the powders or liquid have been introduced. This can lead to damage to the mixer due to the fact that prolonged low speed operation of mixers employing universal motors under relatively high torque loads can cause overheating and motor damage.

What is needed, then, is a food preparation or mixing appliance having the ability to temporarily reduce its speed to allow the introduction of powders or liquids into a mixing bowl without subsequently ejecting them therefrom and thereafter be able to return automatically to the preselected desired mixing speed.

SUMMARY OF THE INVENTION

A food preparation appliance is disclosed herein which includes a housing and an electric motor mounted within the housing. The electric motor is adapted to be connected to a suitable source of alternating current for energization thereby. The motor is drivingly connected to a spindle which can receive a food processing implement in driving connection therewith, the food processing implement being adapted to perform a mechanical operation on a comestible, such as mixing or kneading it. A magnetic tachometer senses the rotational speed of the electric motor and generates a speed sensor signal which is fed to a frequency to voltage converter. The frequency to voltage converter has connected thereto a speed reducing circuit, including a timer switch which is adapted to connect additional capacitance in parallel with a converter capacitance which is connected to the frequency to voltage converter to change the ratio between the frequency of the speed sensor signal and an output voltage of the convertor to thereby effect a reduction in motor speed while the speed reduction capacitor is effectively connected in parallel.

An error amplifier is connected to the frequency to voltage converter to receive the speed indication signal therefrom and to produce an error signal proportional to the difference between the speed indication signal and the setpoint signal. A triac output circuit is connected to the error amplifier and receives alternating current power, the flow of which is controlled by the triac output circuit through the electric motor in response to signals from the error amplifier.

A principal object of the present invention is to provide a food preparation appliance having a speed control including means for temporarily reducing the speed of the appliance by a preselected ratio in order to allow introduction of comestibles to be mixed.

Another objection of the instant invention is to provide a food preparation appliance adapted to temporarily operate at a reduced speed for a sufficiently short time to prevent overheating of the appliance and including means to automatically return the appliance to a higher processing speed after the expiration of said timer interval.

Other objects of the present invention will become obvious to one skilled in the art upon a perusal of the specification and claims in light of the accompanying drawings.

DESCRIPTION OF THE PREFERRED EMBODIMENT

Figure 1:
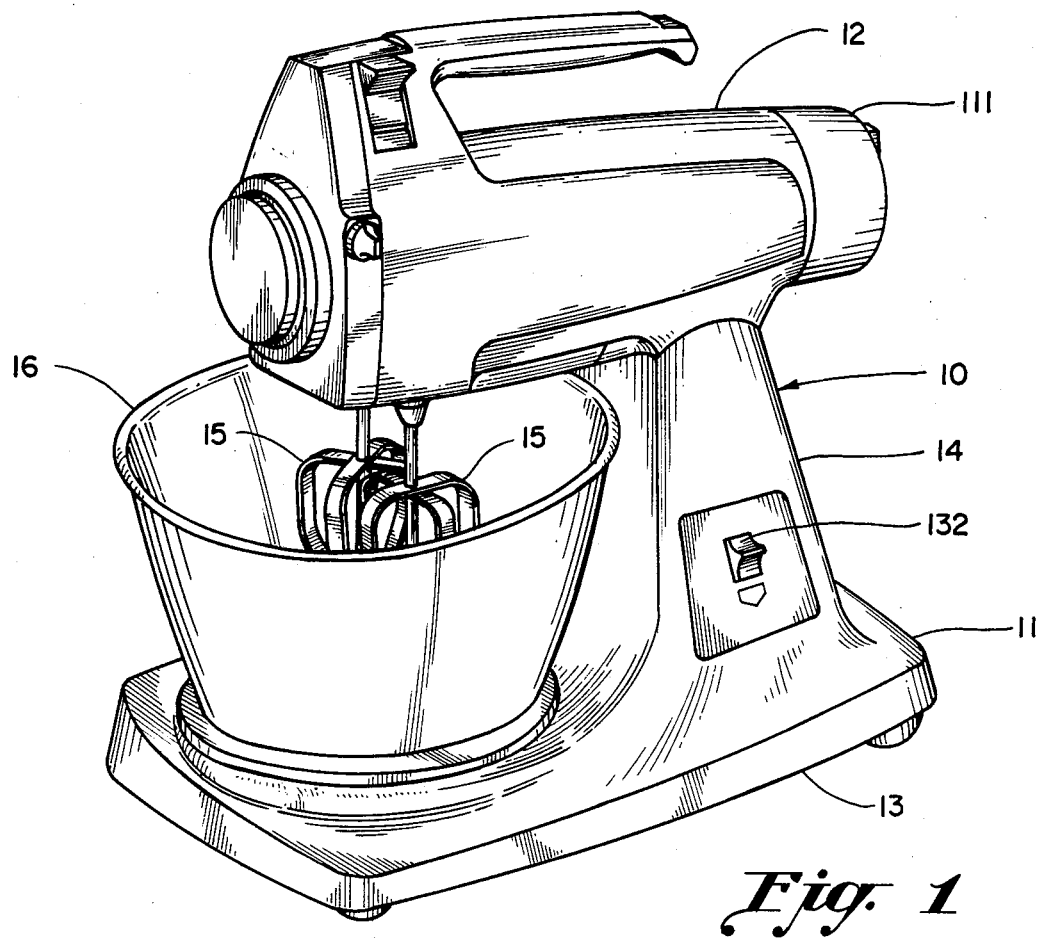
FIG. 1 is a perspective view of a food preparation appliance, more particularly a food mixer, embodying the instant invention.

Referring now to the drawings, and especially FIG. 1, a motor operated food preparation appliance is generally indicated therein by numeral 10. The motor operated food preparation appliance 10, more particularly a food mixer, includes a stand 11 and a mixing head 12. Stand 11 includes a base portion 13 and a hollow pedestal 14. A pair of detachable whippers 15 are drivingly connected to an electric motor in a manner well known in the art. Whippers 15 are seated within a bowl 16 for engagement with a comestible or foodstuff.

Figure 2:
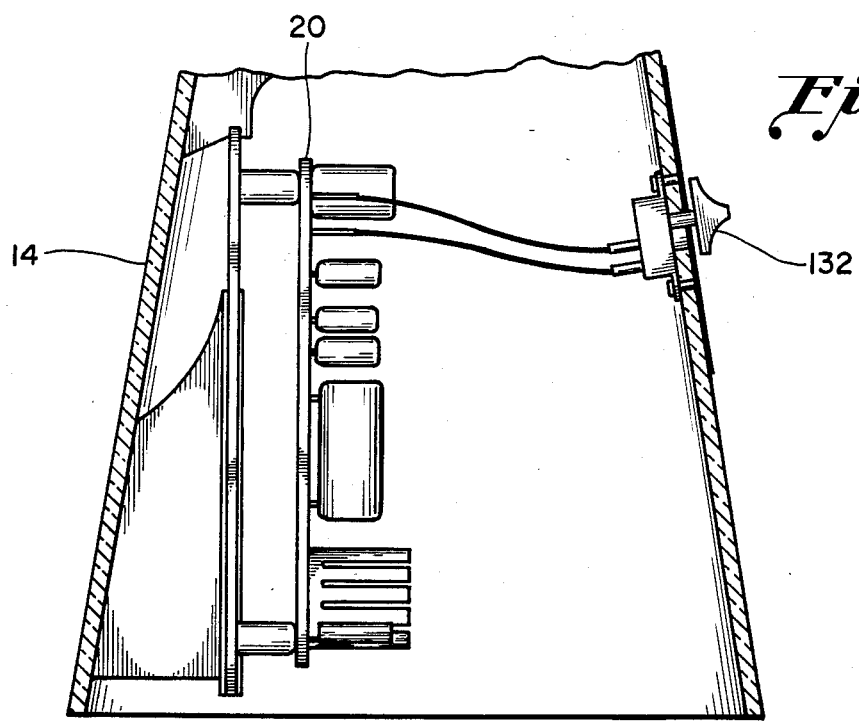
FIG. 2 is a sectional view of a portion of the appliance stand of FIG. 1, taken generally along line 2—2 of FIG. 5 and showing details of the connections between a momentary contact switch and a speed control circuit board.
Figure 3:
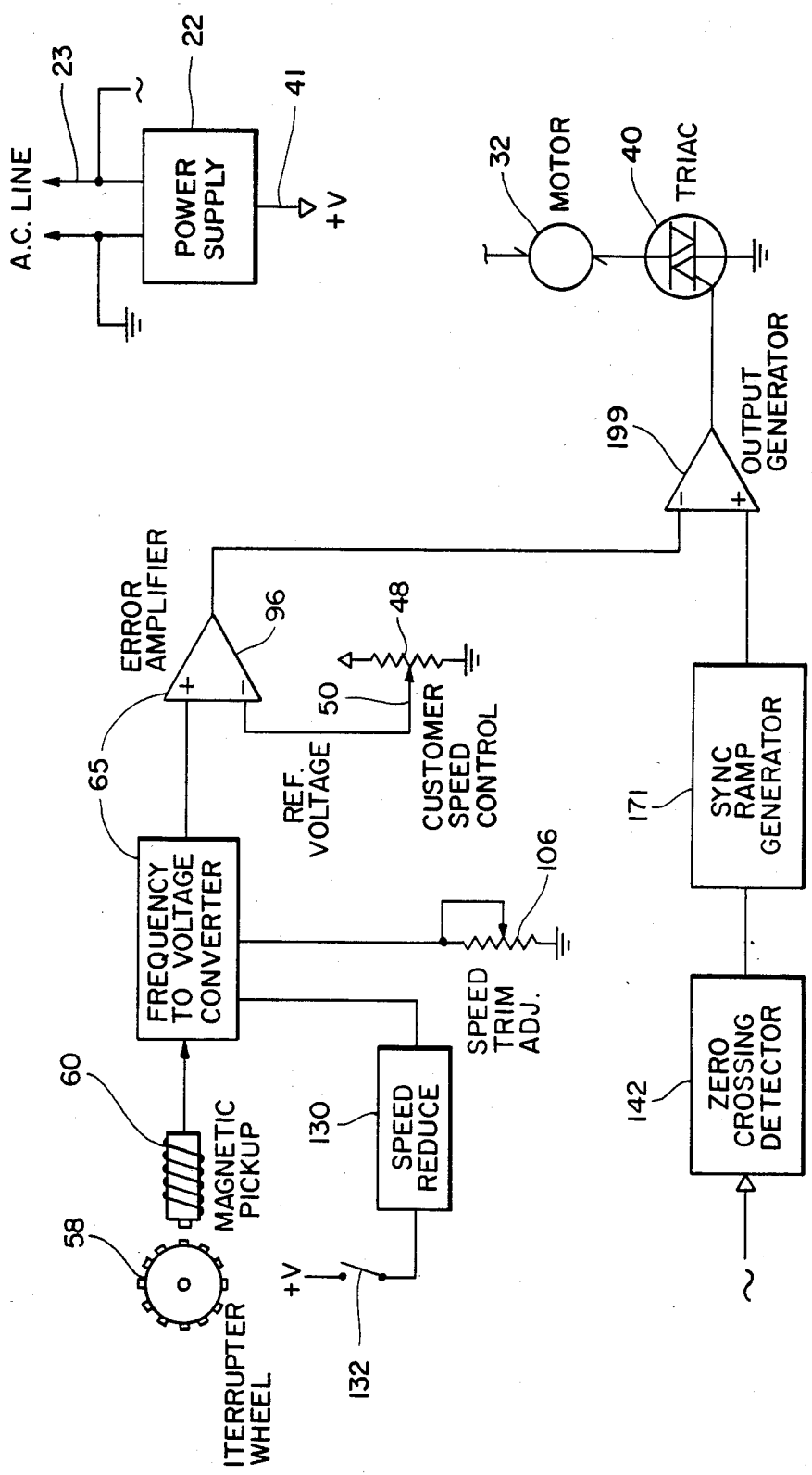
FIG. 3 is block diagram of the speed control circuit of FIG. 2.
Figure 4:
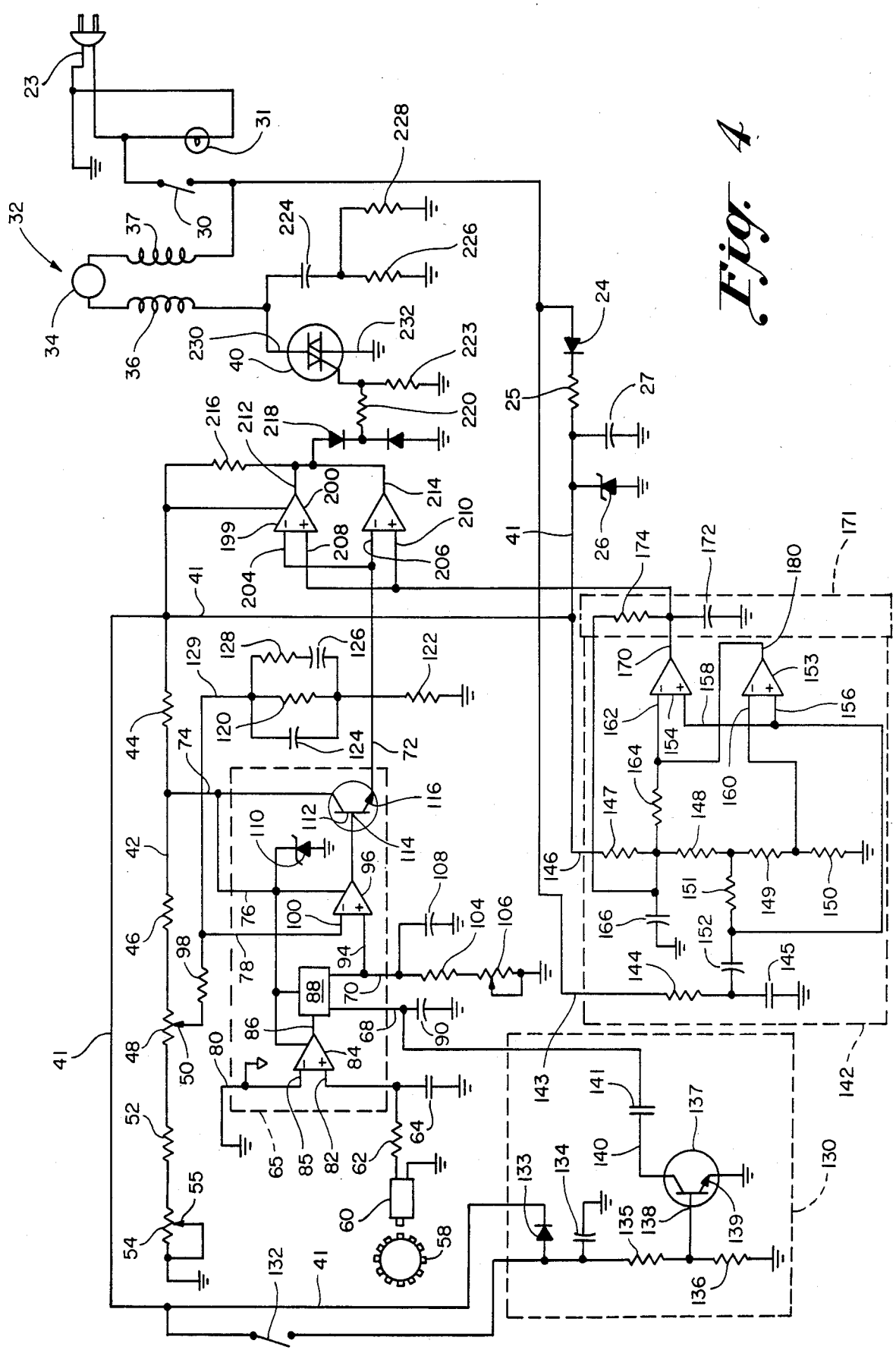
FIG. 4 is a schematic diagram of the speed control circuit of FIG. 3.
Figure 5:
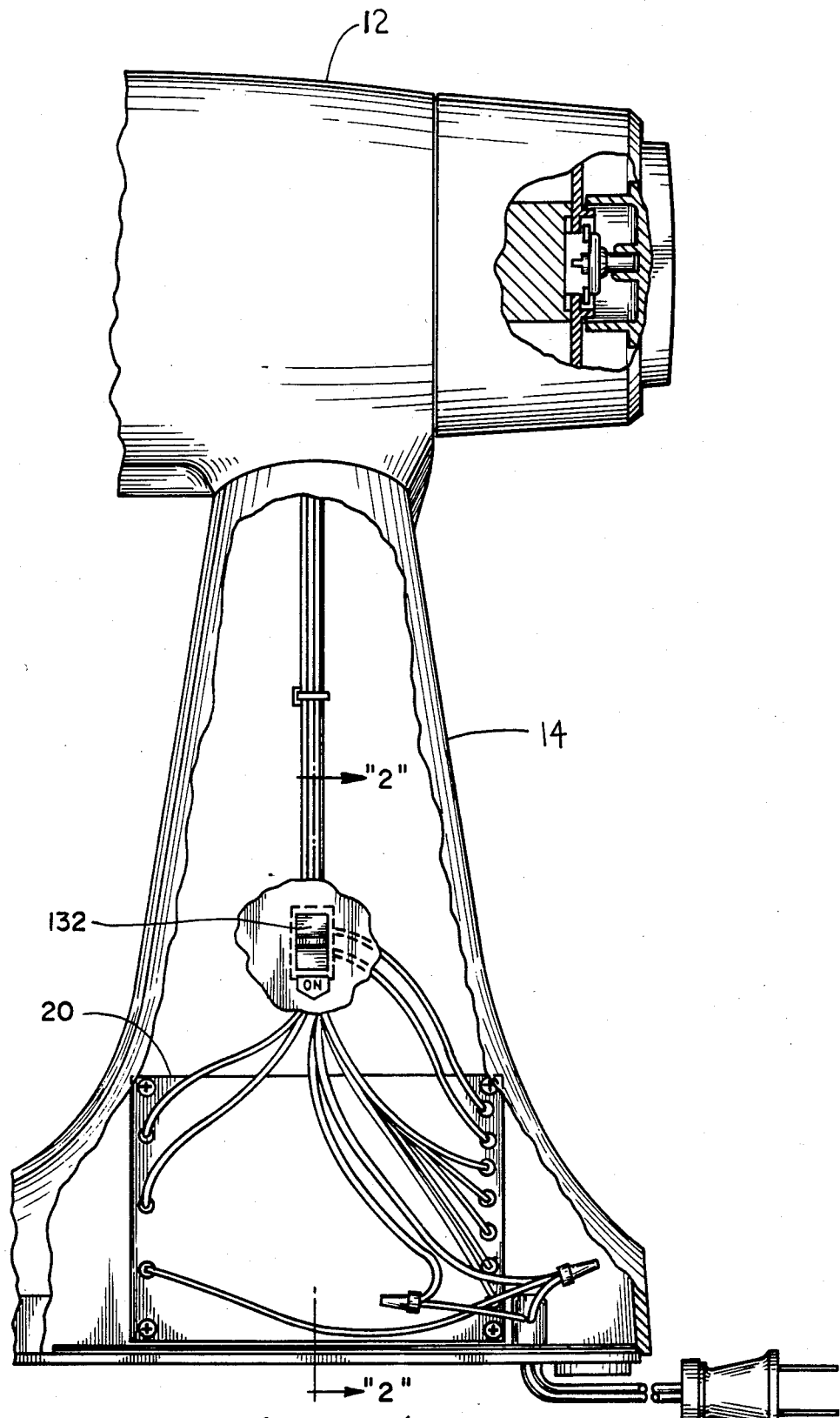
FIG. 5 is a partial side elevational view of a food mixer stand and a rear portion of a food mixer head with portions broken away showing details of the location of the circuit board, the momentary contact switch and the manually actuated drum for selecting a setpoint speed of the mixer.

A feedback motor control circuit 20 is mounted within the hollow pedestal 14, as may best be seen in FIGS. 2 and 5. The feedback motor control circuit 20, as may be seen in FIGS. 3 and 4, has a power supply 22 connected to receive alternating current at line voltage and frequency from a power cord 23. The alternating current is converted to a regulated DC potential by the power supply 22. It is half-wave rectified by a diode 24.

In order to reduce the half wave rectified voltage to a level usable by other portions of the speed control circuit 20, a resistor 25 and a zener diode 26 are connected in series with the diode 24. Filtering of the attenuated half-wave rectified voltage is performed by an electrolytic capacitor 27 connected to the junction of the resistor 25 and the zener diode 26. The speed control circuit 20 is switched off and on by a single pole, single throw switch 30 connected to line cord 23. A lamp 31, also connected to the line cord 23, is illuminated to indicate energization.

A universal motor 32 having an armature 34 and field coils 36 and 37 connected in series therewith is electrically connected to the diode 24 and the switch 30 to receive electric power from the line cord 23. The universal motor 32 may be operated from either alternating current or direct current. The power flow through the universal motor 32 is controlled by a triac 40 connected in series therewith. The triac 40 is also connected to the switch 30 and ultimately to the line cord 23. When the switch 30 is closed, power flow through the universal motor 32 is controlled solely by the triac 40.

In order to control the switching of the triac 40, a speed sensing means comprising a frequency to voltage converter and error amplifier is employed. A positive 22 volt potential is generated by the zener diode 26 at an output lead 41 connected thereto and is supplied to a resistor network 42 comprising a first fixed resistor 44 connected to the lead 41. A second fixed resistor 46 is connected in series with the first fixed resistor 44. A potentiometer 48 is connected in series with the fixed resistor 46. The potentiometer 48 includes a sweep arm 50. A fixed resistor 52 is connected in series with the potentiometer 48. A variable resistor 54 is connected between the fixed resistor 52 and ground. The variable resistor 54 has a sweep arm 55 also connected to ground. Adjustment of the sweep arm 55 alters the potential drop across the resistors 44, 46, 48 and 52.

In order to supply a feedback signal indicative of the rotational speed of the universal motor 32 to the motor control circuit 20, a 24 tooth interrupter wheel 58, composed of a ferromagnetic material, is drivingly connected to the armature 34 of the universal motor 32. A magnetic reluctance pickup 60 is located in proximity with the teeth of the interrupter wheel 58 so that as the motor 32 rotates, the interrupter wheel 58, by varying the reluctance of the magnetic pickup 60, generates a quasi-sinusoidal signal in the magnetic pickup windings, as is well known in the art. A resistor 62 and a capacitor 64 are series connected between the magnetic pickup 60 and ground to filter high frequency, unwanted transients to ground.

In order to convert the frequency of the magnetic pickup signal to a representative voltage, which is linearly related to the speed of the interrupter wheel 58, applicants employ a frequency to voltage converter 65 comprising a well known, commercially available, integrated circuit designed for this purpose and sold by the National Semiconductor Company. In this instance, the circuit is an LM2917N-8 and is packaged in a package having eight pins, respectively numbered 1 through 8 by National Semiconductor. For purposes of this document, those pins are also respectively numbered 66, 68, 70, 72, 74, 76, 78 and 80.

The sine wave signal from the reluctance pickup 60 is supplied to the pin 66 which feeds a noninverting terminal 82 of an operational amplifier 84. The operational amplifier 84 has an inverting terminal 85 connected to both an internal ground and an external ground at an output pin 80. The operational amplifier 84 is operated as a comparator and produces a rectangular wave signal at an output terminal 86. The rectangular wave signal has a frequency equal to the frequency of the signal supplied by the magnetic reluctance pickup 60. The rectangular wave is supplied to a charge pump 88 which is connected through the pin 68 to a grounded capacitor 90, which selects the ratio of the frequency of the input signal from the magnetic pickup 60 to the amplitude of the output signal from the frequency to voltage converter. A second output 70 of the charge pump 88 is connected to a noninverting terminal 94 of an operational amplifier 96. The operational amplifier 96 is also configured as a differential amplifier and has a resistor 98 connected through the pin 78 to an inverting terminal 100. The resistor 98 is also connected to the sweep arm 50 of the potentiometer 48 to recieve a setpoint signal therefrom. The noninverting input terminal 100 of the operational amplifier 96 is also connected to the pin 70, which is series connected to a resistor 104 and a speed trim adjustable resistor 106. The speed trim adjustable resistor 106 is also conected to ground. Current supplied by the charge pump 88 generates a voltage across the resistors 104 and 106 which is sensed by the input terminal 94 of the operational amplifier 96. The operational amplifier 96 functions as an error amplifier. A filtering capacitor 108 is connected in parallel with the resistors 104 and 106 to ground to remove a portion of the AC component from the quasi-sinusoidal signal provided by the magnetic reluctance pickup 60.

The charge pump 88 charges the capacitor 90 from the regulated voltage supplied to pin 74. The zener diode 110 supplies DC voltage to the charge pump 88.

A user can control the speed of the electric motor 32 by selecting a setting of the sweep arm 50 in a conventional manner. The sweep arm 50 is mechanically connected to a rotatable speed selecting drum 111 mounted on the rear of the mixer head 12. The selected sweep arm position yields a regulated reference or setpoint voltage, which is supplied to the input inverting terminal 100 of the error amplifier 96. The DC speed voltage supplied to the inverting terminal 94 is added to the inverse of the user selected reference voltage at the pin 100 and an error output signal is supplied to a transistor 112 at its base 114. The transistor 112 has an emitter 116 connected to the pin 72 for output of a voltage linearly proportional to the difference between the DC speed signal potential and the user selected reference or setpoint potential. A collector 117 of the transistor 112 is connected to the pins 74 and 76.

The reference voltage picked up by the sweep arm 50 is supplied through the resistor 98, in this instance, a 47 kilohm resistor, to the pin 100. A resistor 120 is in the feedback loop between the pin 100 and the emitter 116. The resistor 120 has a resistance of 10 megohms. A resistor 122 is connected between the resistor 120 and ground. A capacitor 124, having a capacitance of 0.0015 microfarads, is connected in parallel with the resistor 120. A series resistance-capacitance circuit comprised of a nonpolar electrolytic capacitor 126, having a capacitance of 0.47 microfarads and a resistor 128, having a resistance of 470 kilohms is connected in parallel with the resistor 120. The resistor 120, the capacitors 124 and 126, and the resistor 128 comprise a feedback circuit 129 between the emitter 116 and the pin 100.

As is well known to those skilled in the art, the feedback circuit 129 provides two ranges of amplification through the error amplifier 96. When the universal motor 32 is operating at a speed close to its desired operating speed, the impedance through the capacitor 126 is relatively high, causing the feedback loop to have about a 10 megohm total impedance, as set by resistor 120. The capacitor 124 acts as an integrating capacitor to remove any remaining ripple from the error signal.

Since the instant invention is to be used in an appliance wherein the motor may be started abruptly, the relatively high gain through the error amplifier 96 as set by the feedback loop to the resistor 120 should be minimized on startup to provide greater circuit stability. This is achieved through the parallel feedback loop of the capacitor 126 and the resistor 128. Since the universal motor 32, when started, in effect, provides a step function signal to the error amplifier 96, the rapidly changing signal encounters a relatively low impedance feedback pathway to the capacitor 126 and the resistor 128. The low impedance path substantially reduces the gain of the error amplifier 96 to render the circuit more stable when the motor speed is rapidly changing.

The addition of too much capacitance at any single point in the error amplifier circuit has the effect of increasing the response time of the circuit or, in effect, making the circuit sluggish. In order to provide adequate filtering, while maintaining the proper response time, a portion of the remaining AC component from the quasi-sinusoidal signal produced by the magnetic reluctance pickup signal 60 is removed by the capacitor 108 while additional filtering is performed by the integrating capacitor 124.

In order to allow a user to temporarily reduce the speed of the universal motor 32 without affecting the setting of the speed selecting potentiometer 48, a speed reducing circuit 130 is provided. The speed reducing circuit 130 includes a lead 131 connected to the lead 41. A momentary contact single pole, single throw switch 132 is connected to the lead 131 to receive the positive 22 volt potential therefrom. A diode 133 is connected across the switch 132 for reasons which will become apparent hereinafter. An electrolytic capacitor 134 is connected to the diode 133 and to ground. A first resistor 135 and a second resistor 136 are connected as a voltage divider. A transistor 137, having a base 138 is connected to the junction of the voltage dividing resistors 135 and 136 at a base 138. The transistor 137 also has an emitter 139 connected to ground and a collector 140 connected to a capacitor 141. The capacitor 141 is connected to the pin 68 and has the same value as the capacitor 90.

When a user desires to reduce the speed of a mixer 10, for instance to allow the addition of ingredients to the mixing bowl 16 while the whippers 15 are rotating, the momentary contact switch 132 is closed and released. As soon as the switch 132 is closed, the capacitor 134 is rapidly charged and drives the transistor 137 from cutoff into saturation, at which point the plate of the capacitor 141 connected to the collector 140 is lowered almost to the ground potential, thus effectively connecting capacitor 141 in parallel with capacitor 90. The two capacitors thereby double the capacitance connected to pin 68, which doubles the magnitude of the output speed indicating signal supplied the to noninverting terminal 94 of the error amplifier 96. This will reduce the speed of the universal motor 32 to one half of the speed selected originally by the speed selecting potentiometer 48. Once capacitor 134 has been charged and the transistor 137 switched into saturation, charge begins to leak off capacitor 134, both through resistors 135 and 136 and through resistor 135 and the base-emitter pathway of the transistor 137. The reduced speed of the motor 32 remains constant until the voltage across capacitor 134 decays to the point at which the transistor 137 drops out of saturation and into the active region. At that point, the voltage across the collector-emitter junction of the transistor 137 begins increasing, causing the speed of the motor 32 to begin ramping back up to full speed. The transistor 137 then is cutoff when the capacitor 134 completely discharges, causing the motor 32 to return to its full setpoint speed. The total time for the reduced speed in the instant embodiment has been selected to be 90 seconds. The interval for ramping during which the transistor 137 is within the active region is approximately 10 to 15 seconds in length. Thus, the user has ample opportunity to add ingredients and the motor 32 is then quickly ramped back up to normal speed without throwing the ingredients from the bowl 16 and without operating the motor 32 under heavy loads which might cause it to overheat. In the event that the user wishes to foreshorten the preselected time interval, he can open switch 30 which will cause capacitor 134 to quickly discharge through diode 133. When switch 130 is reclosed, the transistor 137 will be in cutoff and the motor 32 will resume its normal setpoint speed.

In order to provide accurate timing of the point at which the triac 40 switches into conduction to allow the electric power to flow through the universal motor 32, a zero crossing detector 142 is provided. Since the amount of power the motor receives is dependent upon the point in the alternating current cycle at which the triac 40 switches on for each half cycle of alternating line current, the zero crossing detector measures characteristics of the line alternating current so that the switching signal will be properly synchronized with the zero crossing point. AC power at 120 volts RMS is supplied to an input terminal 143 of the zero crossing detector 142. In order to allow solid state electronic components to perform the necessary timing and sensing functions, the AC power line signal is attenuated by a factor 1 and 12 through a resistor 144 connected to the input terminal 143. Spiking, transients, or other signals having a frequency higher than the basic power line frequency, are conducted to ground through a capacitor 145. Thus, a signal having a wave shape identical to and in phase with the power line signal but having a peak to peak voltage of about 15 volts is present at the junction of the resistor 144 and a capacitor 145.

A DC voltage must be added to the attenuated AC signal to shift the level of the AC signal sufficiently so that no portion of the level shifted signal is below zero volts. This is achieved by connecting a resistance network 146 to the regulated power supply output to receive positive 22 volts therefrom. The resistance network 146 is comprised of a plurality of resistors respectively numbered 147, 148, 149 and 150 connected between the power supply lead 41 and ground. The resistance values have been selected so that the DC potential at the junction of the resistors 147 and 148 is about 11.32 volts, while the DC potential at the junction of the resistors 148 and 149 is about 11 volts. The DC potential at the junction between the resistors 149 and 150 is about 10.68 volts. A resistor 151 and a capacitor 152 are connected in series between the respective junctions of the resistors 148 and 149 and the resistor 144 and the capacitor 145. The junction of the resistors 148, 149 and 151 is, in effect, an AC ground point. Thus, the attenuated AC signal and the 11 volt DC signal are added together so that a level shifted AC signal varying between +3.5 and +18.5 volts and in phase with the power line voltage is present at the junctions of the resistor 151 and the capacitor 152. The level shifted voltage is supplied to a pair of comparators, respectively numbered 153 and 154, and having respective noninverting input terminals 156 and 158. In the present embodiment, the comparators 153 and 154 are National Semiconductor Company LM 339 operational amplifiers. The comparator 153 also receives, at an inverting terminal 160, the 10.68 voltage DC potential from the junction of the resistors 149 and 150. Likewise, the comparator 154 receives the 11.32 volt DC potential at an inverting terminal 162 through a resistor 164 connected to the junction of the resistors 147 and 148. An electrolytic capacitor 166 is connected between the junction of resistors the 147 and 148 and ground to conduct any high frequency AC components from the power supply 22 and the input terminal 143 present on the voltage divider network 146 away from the comparators 153 and 154.

In order to produce a timing signal throughout the alternating current cycle, it is necessary to, in effect, have one of the comparators handle the negative of the AC voltage and the other handle the positive portion. An output terminal 170 of the capacitor 154 remains in grounded condition due to its open collector configuration until the level shifted AC voltage exceeds 11.32 volts. At this point, the output terminal 170 switches to a blocking condition, allowing a sync ramp generator 171, having a capacitor 172, to be charged through a resistor 174, which is connected to receive the positive 11.32 volt regulated potential from the junction of the resistors 147 and 148.

The time constant of the capacitor 172 and the resistor 174 is selected so that for the interval that the output terminal 170 remains blocking, the capacitor 172 charges in a linear fashion to provide a ramp voltage having a linear relationship with time. The ramp voltage has a minimum of zero volts when the capacitor 172 begins charging and a maximum of about four volts, which is reached at the same time that the level shifted AC potential drops below 11.32 volts. When the level shifted AC potential is between 10.68 volts and 11.32 volts, the output terminal 170 of the capacitor 154 is connected to ground, rapidly discharging the capacitor 172. Once the level shifted voltage drops below 10.68 volts, an output terminal 180 of the comparator 152 is grounded, causing the noninverting input terminal 162 of the comparator 154 to become grounded, again switching the output terminal 170 blocking and allowing the capacitor 172 to charge.

Thus, the output terminal 170 of the zero crossing detector 142 remains in a blocking state at nearly all times with the exception of the short period at alternating current zero crossing when the output terminal 170 is grounded. This allows the capacitor 172 and the resistor 174 of the sync ramp generator 171 to charge and discharge to produce a sawtooth wave potential at an output lead 182. The sawtooth wave potential has a frequency twice the line frequency of the alternating current and is in synchronism therewith. The sawtooth wave provides a highly linear and very precise timing reference signal.

In order to select a conduction angle of the triac 40, it is necessary to process both the sawtooth timing reference signal and the error signal. The error signal is supplied to an output comparator 199 consisting of a pair of National Semiconductor LM 339 operational amplifier comparators, respectively numbered 200 and 202, and having respective inverting input terminals 204 and 206. The sawtooth timing reference signal is supplied to the comparators 200 and 202 at a pair of respective noninverting input terminals 208 and 210. A pair of output terminals 212 and 214, respectively, of the comparators 200 and 202, are connected to a resistor 216 which receives the positive 22 volt reference signal from lead 41 of the regulated power supply 22. The comparators 200 and 202 are identical to the comparators 153 and 154.

In other words, as long as the potential at the inverting input terminal is less than the potential at the noninverting input terminal, the output terminal will remain in blocking state. This two state condition is used to control or steer a trigger signal to the triac 40. At the point during each alternating current half cycle at which the timing reference signal exceeds the error amplifier signal, the comparator output terminals 212 and 214 switch to a blocking condition, thereby supplying a DC trigger signal to a diode 218 through a resistor 220 and to a gate 222 of the triac 40. The triac 40 then switches conducting to supply electric current to the universal motor 32. A resistor 223 is connected to the junction of the resistor 220 and the gate 222 and ground to prevent false triggering of the triac 40.

The DC trigger signal is particularly desirable since the motor current interruption caused by brush bounce will not cause the triac 40 to switch to a nonconducting state, as would occur in prior art circuits which supply pulse trigger signals to triac gates.

Since the error amplifier signal is proportional to the amount of power which the electric motor 32 must draw to operate at a selected speed, and since the amplitude of the timing signal is also substantially linear with respect to time, the combination of the two signals provides a very precise timing of the switching point of the triac 40. A snubber network consisting of a capacitor 224 and a pair of parallel resistors 226 and 228 is connected from a first main terminal 230 of the triac 40 to ground to protect the triac 40 during switching from damage due to the inductive load of the electric motor 32. A second main terminal 232 of the triac 40 is also connected to ground for ground return.

The instant invention not only provides a highly accurate speed control for an electric motor of a food preparation appliance, but also provides a means whereby a user of the appliance can quickly and easily, automatically reduce the speed of the motor for a preselected time in order to easily add ingredients to a mixing bowl without having the ingredients thrown from the bowl or splashed on the user. In addition, the instant control reduces the likelihood of appliance failure due to the fact that lightweight mixing powders such as flour, may be drawn into the ventilating openings of the mixer head and cause damage to the motor. Furthermore, the instant invention provides a means for lowering the speed of a mixing appliance for a relatively brief interval in order to allow the addition of ingredients to a bowl and then automatically returning the appliance to a setpoint speed before the electric motor driving the appliance is damaged due to overheating by operating at low speeds under heavy loads.

While there has been shown and described a single embodiment of the present invention, it will be understood that changes and modifications may be made to the invention by those skilled in the art, and it is, therefore, intended in the appended claims to cover all such changes and modifications as fall within the true spirit and scope of the present invention.

What is claimed as new and desired to be secured by Letters Patent of the United States is:

1. A food preparation appliance comprising: a housing; an electric motor supported by said housing and receiving a flow of electric current, said electric motor driving a food preparation implement; control means for controlling electric power connected to said electric motor and receiving said electric current to control a speed of said electric motor; and means for altering said flow of electric current through said control means for a predetermined time interval to reduce said speed of said electrical motor during said time interval, said means for altering said flow of electric power including a timer and means for actuating said timer, said timer when actuated causing said flow of electric power to be altered until expiration of said predetermined time when said flow of electric power is returned to its unaltered state.

2. A food preparation appliance as defined in claim 1, wherein said means for altering said flow of electric power reduces said flow of electric power to reduce said speed of said electric motor during said time interval.

3. A food preparation appliance for mechanically processing a comestible, comprising: a housing; an electric motor supported by said housing and having means for receiving an electric current from a suitable source of electric current of energization; a food processing implement drivingly connected to said electric motor for actuation thereby in order to perform a mechanical operation on a comestible; means for sensing a rotational speed of said electric motor and generating a speed sensor signal; means for converting said speed sensor signal to a speed indicating signal with said speed sensor signal bearing a constant relationship to said speed indicating signal, said conversion means also including means for altering said constant relationship between speed sensor signal and said speed indicating signal upon actuation of a switch means connected to said conversion means to reduce said rotational speed of said electric motor; means for comparing said speed indicating signal to a setpoint signal and producing an error signal proportional to a difference between said speed indicating signal and said setpoint signal; and means for controlling flow of electric power receiving said error signal and controlling a flow of electric power from said electric power source through said electric motor.

4. A food preparation appliance for mechanically processing a comestible, as defined in claim 3, wherein said means for converting said speed sensor signal to a speed indicating signal comprise a frequency to voltage converter having a conversion ratio capacitor connected thereto.

5. A food preparation appliance for mechanically processing a comestible, as defined in claim 4, wherein said means for altering said constant relationship includes a second capacitor to adapted to form a parallel capacitance with said first capacitor when said means for altering said constant relationship is actuated by an external switch.

6. A food preparation appliance for mechanically processing a comestible, as defined in claim 5, wherein a resistance-capacitance timer is connected between said external switch and said second capacitor to maintain said second capacitor in parallel with said conversion ratio capacitor for a preselected time interval.

* * * * *